Patented Aug. 11, 1931

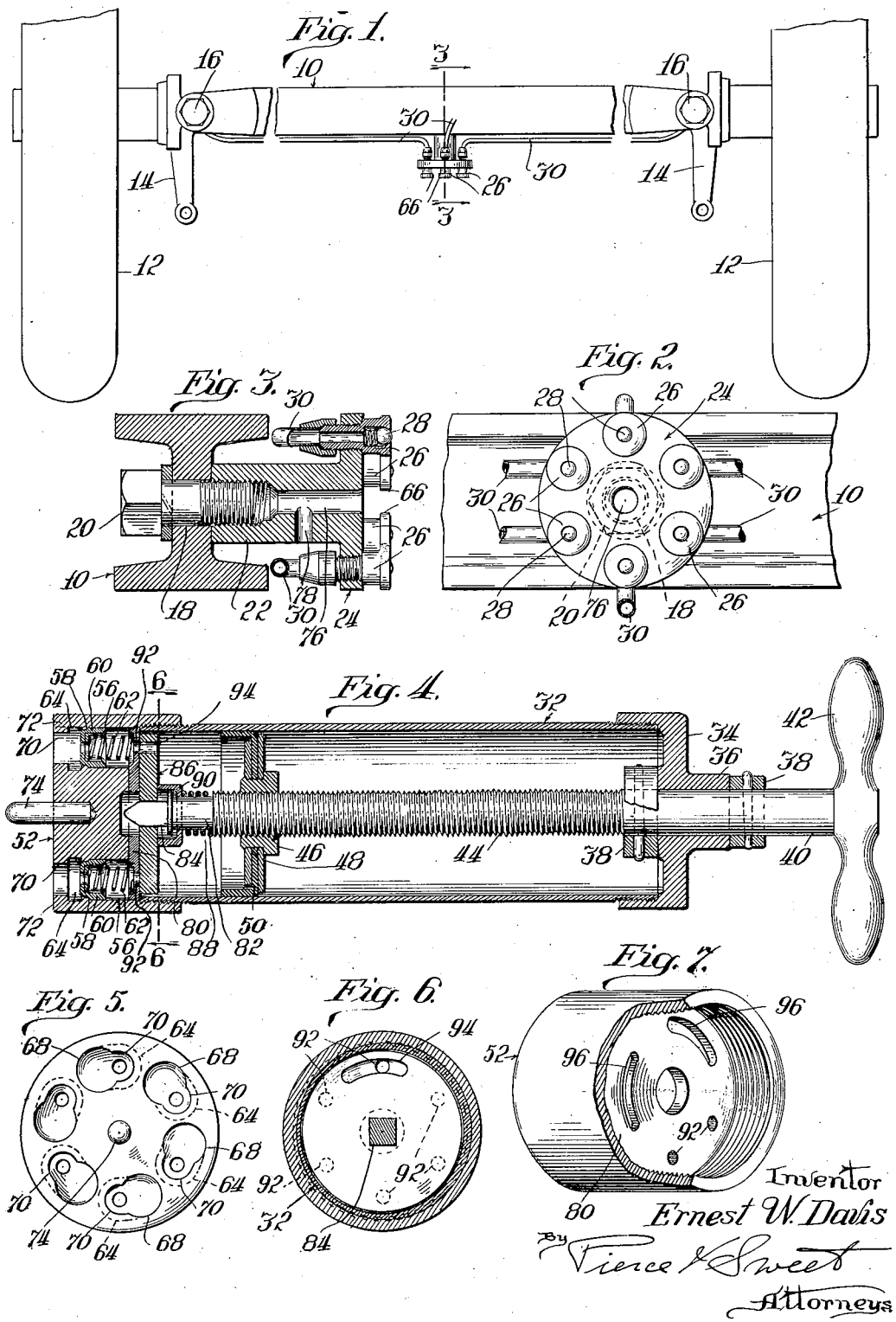

1,818,464

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

LUBRICATING SYSTEM

Application filed April 11, 1925. Serial No. 22,489. REISSUED

My invention relates to lubrication and more specifically to an improved lubricating system for efficient periodic lubrication of a relatively large number of machine elements without waste of lubricant.

Among the objects and advantages of the invention may be enumerated:

First, the provision of a simple and efficient means for simultaneously lubricating a plurality of different bearings at a single operation.

Second, the automatic apportionment of the oil to the different bearings in proportion to their needs.

Third, a mechanism readily attached to the machine without any modifications of the existing structure.

Fourth, reduction to a minimum of the parts permanently associated with the machinery to be lubricated.

Fifth, the elimination of lubricant storage means fastened to the machine itself.

Further objects and advantages of the invention will become apparent as the description proceeds.

In the accompanying drawings:

Figure 1 is a plan view of a machine unit indicating the application of a lubricating system according to the invention thereto.

Figure 2 is a front elevation of the terminal device.

Figure 3 is a section on line 3—3 of Figure 1.

Figure 4 is a section of the lubricant dispenser.

Figure 5 is an end view of the discharge end of the dispenser.

Figure 6 is a section on line 6—6 of Figure 4.

Figure 7 is a perspective of the end casting for the dispenser showing a modification in the arrangement of the apportioning means.

In the embodiment of the invention selected for illustration the system is shown as applied to an appropriate unit of machinery such as the front axle of an automobile. The axle 10 carries the usual wheels 12 on steering knuckles 14 pivoted at 16.
The web of the axle is bored at 18 to receive fastening bolt 20 for fastening in place the tube 22. The outer end of tube 22 is flared to form a plate 24 in which are mounted a plurality of terminal fittings 26 for the reception of lubricant. These terminals preferably, but not necessarily, include ball check valves 28. From each terminal 26 an individual tube 30 runs to a pivot 16 or any other part requiring lubrication.

The dispenser illustrated comprises a tubular barrel 32 closed at its upper end by a cap 34 having a boss 36 for abutment with collars 38 on the shaft 40. This shaft carries a suitable handle or hand wheel 42, and is threaded at 44 inside the pump to drive the piston. The piston comprises nut 46 threaded on rod 40 and retaining plates 48 fastened on the outside of the nut to retain the cup washer 50.

The bottom cap 52 is formed with a plurality of peripherally spaced bores 56 corresponding to the receiving fittings 26, each bore having a shoulder at 58 to hold the sealing washer 60 against the force of spring 62. Beyond the shoulder the bore is enlarged again at 64 to receive the head 66 of its fitting, which head engages the sealing gasket and lifts it off shoulder 58 so that spring 62 presses the gasket against the head to form a tight seal when the parts are connected. The openings at the bottom of the bottom plate are in the form of key hole slots each having an enlarged portion 68 capable of receiving the head 66 and a slot portion 70 adapted to receive the shank, whereby a retaining flange 72 is formed to engage the underside of the head and hold the parts in place. The dispenser is simultaneously connected with all the receiving fittings by pushing it axially over them and after the heads have passed through openings 68 rotating the whole device counter-clockwise as seen in Figure 5 to move all the fittings into the slots. To facilitate connecting parts, I provide an axial pin 74 projecting from the center of part 52 and adapted to enter the bore 76 in tube 22 to keep the dispenser and fittings in alignment. A lateral opening 78 is provided to prevent bore 76 from becoming clogged with dirt.

I have provided suitable means for automatically dispensing to each fitting during a single rotation of shaft 40 an appropriate small measured dose of lubricant. Plate 80 fits over the upper surface of end cap 52 and retains all the springs 62 in place, being itself held by abutment at its outer edge with the end of tube 32 and clamped against said edge by threading the bottom cap 52 in place. Shaft 40, beyond the threaded portion 44, has a short cylindrical portion 82 and a smaller squared portion 84. Distributing plate 86 has a square central hole to receive part 84, and rotates in close fitting engagement with plate 80 by reason of the tension of spring 88 encircling part 82 and bearing against a yoke 90 carried by plate 86. Plate 80 is provided with a series of openings 92, one for each bore 56, and plate 86 is provided with a slot 94 radially spaced to register in succession with each of the openings 92 and connect the dispenser during a predetermined portion of a revolution with the particular fitting in question. It will be apparent that rotation of handle 42 will not only force the piston axially toward the bottom of the dispenser but connect the body of lubricant being expelled by the piston in series with each of the discharge connections previously described. The pitch of threads 44 is preferably such that the friction of the piston on the barrel 32 is all that is required to prevent the piston from rotating with the shaft.

Without further elaboration, the foregoing will so fully explain the gist of my invention, that others may, by applying current knowledge, readily adapt the same for use under various conditions of service. It will, for instance, be obvious that where the different bearings require different amounts of lubricant, openings 92 may themselves be slots of varying length, although preferably the entire circumference is so laid out that the clearance between successive openings 92 are all equal, and that slot 94 is of the exact length necessary to bridge said clearance, so that no two discharge connections will ever be open at the same time and thus connected to each other, and at the same time no appreciable intervals will occur when there is no exit for the lubricant. Thus, in Figure 7 there are two long slots 96 in plate 80, and two holes 92. To permit this change without changing the structure of bottom piece 52 one of the two fittings connected with each slot 96 will be plugged, and only four delivery tubes will lead away to the parts to be lubricated. This and many other modifications and alterations may readily be made by those skilled in the art without eliminating certain features which may properly be said to constitute the essential items of novelty involved, which items are intended to be defined and secured to me by the following claims.

I claim:

1. A portable lubricant gun comprising a body having a plurality of ports each adapted for quick detachable connection with a conduit, individual conduit sealing means in each port, a rotatable shaft in said body, a lubricant compressing element moved longitudinally by rotating said shaft, and a distributor rotating with said shaft for connecting the compressed lubricant with each of said ports seriatim.

2. A lubricant gun having a plurality of ports each port having means for making a quick detachable connection with a lubricant receiving conduit, compressing means in said gun, a distributing device for controlling the delivery of the lubricant to the different ports, and a common manual drive element forming the sole means for actuating both said compressing means and said distributing device.

3. A lubricant gun having a plurality of ports each port having means for making a quick detachable connection with a lubricant receiving conduit, lubricant compressing means in said gun, and a distributor actuated by operation of said compressing means for automatically apportioning the lubricant among the different ports.

4. A pressure lubricating system comprising a portable lubricant gun having a plurality of discharge ports, a plurality of lubricant conduits converging from points to be lubricated to terminate adjacent each other, and quick detachable means for coupling said gun to all said conduits.

5. A pressure lubricating system comprising a lubricant gun having a plurality of discharge ports, a plurality of lubricant conduits converging from points to be lubricated to terminate adjacent each other, quick detachable means for coupling said gun to all said conduits, and distributing means in said gun for delivering individually measured quantities of lubricant seriatim to said discharge ports.

6. A pressure lubricating system comprising a plurality of lubricant conduits converging from points to be lubricated to terminate adjacent each other, a lubricant gun, quick detachable connections between said conduits and said gun, and automatic means for connecting the reservoir of said gun with each of said conduits, one at a time.

7. A pressure lubricating system comprising a gun having a plurality of external ports equally spaced about the periphery of a circle, a mechanism inside said gun for delivering measured doses of lubricant to each port, a support, a plurality of receiving terminals on said support spaced about the periphery of a circle, said ports and terminals being shaped for bayonet slot interengagement to connect said gun to all said terminals, said support having an axial bore, an axial pin on said gun entering said bore to center the gun and support, and delivery conduits from said terminals to points to be lubricated.

8. A pressure lubricating system comprising a gun having a plurality of external ports equally spaced about the periphery of a circle, a mechanism inside said gun for delivering measured doses of lubricant to each port, seriatim, a support, a plurality of receiving terminals on said support spaced about the periphery of a circle, said ports and terminals being shaped for bayonet slot interengagement to connect said gun to all said terminals, said support having an axial bore, an axial pin on said gun entering said bore to center the gun and support, and delivery conduits from said terminals to points to be lubricated.

9. A pressure lubricating system comprising a gun having a plurality of external ports equally spaced about the periphery of a circle, a mechanism inside said gun for delivering measured doses of lubricant to each port, a support, and a plurality of receiving terminals on said support spaced about the periphery of a circle, said ports and terminals being shaped for bayonet slot interengagement to connect said gun to all said terminals.

10. A pressure lubricating system comprising a portable gun having a plurality of external ports equally spaced about the periphery of a circle, a mechanism inside said gun for delivering measured doses of lubricant to each port, a support permanently mounted upon the machine to be lubricated, and a plurality of receiving terminals on said support spaced about the periphery of a circle to register with and be detachably connected to the gun establishing communication between the terminals and said ports.

11. A pressure lubricating system comprising a gun having a plurality of external ports equally spaced about the periphery of a circle, a mechanism inside said gun for delivering measured doses of lubricant to each port, and a plurality of receiving terminals spaced about the periphery of a circle to register with said ports and adapted for quick detachable connection therewith.

12. A pressure lubricating system comprising a plurality of conduits leading to a plurality of points to be lubricated, said conduits converging to terminate adjacent each other, a check valve at the inlet end of each conduit opening toward the point to be lubricated, a unitary device for delivering a measured quantity of lubricant to each conduit and quick detachable means for coupling said device to said conduits.

13. A pressure lubricating system comprising a plurality of conduits leading to a plurality of points to be lubricated, said conduits converging to terminate adjacent each other, a check valve at one end of each conduit opening toward the point to be lubricated, and a device for delivering a measured quantity of lubricant to each conduit at each operation thereof, said device being portable relative to said conduits and having means for simultaneously making a mechanical connection with all of said conduits.

14. A pressure lubricating system comprising a plurality of conduits leading to a plurality of points to be lubricated, said conduits converging to terminate adjacent each other, a check valve in each conduit opening toward the point to be lubricated, and portable means for delivering lubricant to said conduits, said means including quick detachable connections whereby it may be simultaneously connected to all of said conduits.

15. A pressure lubricating system comprising a plurality of open conduits leading to a plurality of points to be lubricated, said conduits converging to terminate adjacent each other, a check valve at the inlet end of each conduit opening toward the point to be lubricated, and means for simultaneously connecting a plurality of lubricant discharge ports to said conduits.

16. A pressure lubricating system comprising a plurality of open conduits leading to a plurality of points to be lubricated, said conduits converging to terminate adjacent each other, a check valve at the inlet end of each conduit opening toward the point to be lubricated, and a quick attachment terminal for each conduit.

17. A lubricant gun comprising a body having a plurality of ports, a distributor covering said ports, resilient means keeping said distributor sealed over said ports, compressing means in said body, and a driving connection between said compressing means and said distributor, said driving connection and said resilient means operating independently.

18. A lubricant gun comprising a body having a plurality of ports, a distributor covering said ports, resilient means keeping said distributor sealed over said ports, compressing means in said body, and a driving connection between said compressing means and said distributor.

19. A motor vehicle lubricating system for motor vehicles having a frame and axles movable with respect thereto, comprising a set of conduits leading from a plurality of elements requiring lubrication and carried by the same axle, said conduits terminating adjacent each other at a point on said axle, and unitary portable means for simultaneously making a coupling connection with the ends of all of said conduits and thereafter injecting lubricant into all said conduits.

20. A motor vehicle lubricating system for motor vehicles having a frame and axles movable with respect thereto, comprising a set of conduits leading from a plurality of elements requiring lubrication and carried by the same axle, said conduits terminating adjacent each other at a point on said axle, and unitary means for simultaneously making a coupling connection with the ends of all of said conduits and thereafter injecting lubricant into all said conduits seriatim.

21. A lubricant gun comprising a body having a plurality of ports, a plurality of conduits adapted to register with said ports and having quick detachable connecting means for mechanical attachment thereto, individual conduit sealing means in each port, and lubricant compressing means in said body.

22. A lubricating system comprising a plurality of conduits for conducting lubricant to various bearings of a mechanism, a common terminal for all of said conduits, a lubricant compressor having means for making a quick detachable sealed connection with said terminal, and means for determining the quantity of lubricant supplied to each of said conduits.

23. A lubricating system comprising a plurality of conduits for conducting lubricant to various bearings of a mechanism, a common terminal for all of said conduits, a lubricant compressor having means for making a quick detachable sealed connection with said terminal, and means in said compressor for determining the quantity of lubricant supplied to each of said conduits.

24. The combination of a lubricant gun comprising a body having a plurality of ports, and a plurality of receiving conduits, said conduits and said gun having quick detachable inter-engaging means adjacent said ports whereby said conduits may be simultaneously connected to said gun in communication with said ports.

25. The combination of a lubricant compressor having a plurality of discharge ports, a plurality of lubricant receiving fittings adapted to register with said ports, and cooperating means on said compressor and said fittings for making quick detachable connections therebetween, said last named means being operable by movement of said compressor relative to said fittings.

26. The combination of a lubricant compressor having a plurality of discharge ports, a plurality of lubricant receiving fittings adapted to register with said ports, cooperating means on said compressor and said fittings for simultaneously making quick detachable mechanical connections therebetween, and means for sealing said connections.

27. The combination of a lubricant compressor comprising a plurality of discharge ports, a plurality of lubricant receiving fittings adapted to register with said ports and mounted upon a common support movable relative to said compressor, and interengaging means on said compressor and said support for guiding all of said ports into registry with said fittings.

28. In combination, a portable lubricant compressor, a plurality of bearings requiring lubrication, a plurality of separate conduits each having one end connected to one of said bearings, the other ends of said conduits being arranged in close proximity, and means connected to said compressor for simultaneously making quick detachable connections with the proximate ends of said conduits, whereby lubricant may be forced into said bearings upon making said connection.

In witness whereof, I hereunto subscribe my name this 31st day of March, 1925.

ERNEST W. DAVIS.